US012632824B2

(12) United States Patent
Weakley et al.

(10) Patent No.: US 12,632,824 B2
(45) Date of Patent: May 19, 2026

(54) VIRTUAL SHIELDING SYSTEM AND METHOD FOR INVENTORY TRACKING

(71) Applicant: CHECKPOINT SYSTEMS, INC., Thorofare, NJ (US)

(72) Inventors: Thomas Craig Weakley, Simpsonville, SC (US); Sergio Ramos Jubierre, Barcelona (ES); Alan Green, Clinton, SC (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 443 days.

(21) Appl. No.: 18/107,069

(22) Filed: Feb. 8, 2023

(65) Prior Publication Data

US 2023/0252408 A1      Aug. 10, 2023

Related U.S. Application Data

(60) Provisional application No. 63/308,108, filed on Feb. 9, 2022.

(51) Int. Cl.
| | |
|---|---|
| *G06Q 10/087* | (2023.01) |
| *G06K 7/10* | (2006.01) |
| *G06K 19/07* | (2006.01) |

(52) U.S. Cl.
CPC ....... *G06Q 10/087* (2013.01); *G06K 7/10099* (2013.01); *G06K 19/0723* (2013.01)

(58) Field of Classification Search
CPC ............. G06Q 10/087; G06Q 10/0833; G06K 7/10099; G06K 19/0723; H04W 4/021; H04W 4/029; H04W 4/80; H04W 12/47

USPC .......................................................... 705/28
See application file for complete search history.

(56) References Cited

U.S. PATENT DOCUMENTS

| | | | | |
|---|---|---|---|---|
| 9,400,971 | B1 * | 7/2016 | Russell ................ | G06Q 10/087 |
| 11,244,282 | B1 * | 2/2022 | Diorio ................ | G06K 19/0705 |
| 2005/0206555 | A1 | 9/2005 | Bridgelall et al. | |
| 2007/0018820 | A1 | 1/2007 | Chand et al. | |
| 2009/0160622 | A1 * | 6/2009 | Bauchot ............ | G06K 17/0029 |
| | | | | 340/10.32 |
| 2010/0141385 | A1 | 6/2010 | Shiau et al. | |
| 2011/0183717 | A1 | 7/2011 | Brede | |
| 2018/0247092 | A1 * | 8/2018 | Khojastepour .... | G06K 7/10069 |
| 2019/0058969 | A1 | 2/2019 | Ambha Madhusudhana et al. | |

(Continued)

FOREIGN PATENT DOCUMENTS

| | | | |
|---|---|---|---|
| TW | 201250610 A | * | 12/2012 |

OTHER PUBLICATIONS

"R-LIM: an Affordable Library Search System Based on RFID"— Jung-Wook Choi, Dong-Ik Oh, Il-Yeol Song (2006).

(Continued)

*Primary Examiner* — Russell S Glass
(74) *Attorney, Agent, or Firm* — McDonald Hopkins LLC

(57) ABSTRACT

An inventory monitoring system and process for monitoring inventory is shown and described herein. The system and process includes an RFID reader configured to collect or receive product code data, location data, and secondary metric data of inventory RFID tags relative to that of other RFID tags or markers for determining the location of the inventory from such data. From the information obtained from the RFID tags, the location of inventory in an environment can be determined.

17 Claims, 5 Drawing Sheets

(56)         References Cited

U.S. PATENT DOCUMENTS

2022/0027941 A1 * 1/2022 Ramboz ............ G06Q 30/0223

OTHER PUBLICATIONS

"Passive UHF-RFID Localization Based on the Similarity Measurement of Virtual Reference Tags"—Lingfei Mo, Chenyang Li—vol. 68 No. 08 (Aug. 2019).
"Robotic Inventorying and Localization of RFID Tags, Exploiting Phase-Fingerprinting"—Stavroula Siachalou, Spyros Megalou, Anastasios Tzitzis, Emmanouil Tsardoulias, Aggelos Bletsas, John Sahalos, Traianos Yioultsis, Antonis G. Dimitriou—p. 362-367 (2019).
"Relative Localization of RFID Tags using Spatial-Temporal Phase Profiling"—Longfei Shangguan, Zheng Yang Alex X. Liu Zimu Zhou Yunhao Liu—p. 251-263 (2015).
"Estimating Relative Tag Locations based on Time-Differences in Read Events"—Thomas Hasler, Matthias Wolbitsch, Michael Goller, Simon Walk (2019).
"Ubiquitous moisture sensing in automaker industry based on standard UHF RFID tags"—Joan Melia-Segui, Xavier Vilajosana (2019).

Choi JW, Oh DI, Song IY. R-Lim: an affordable library search system based on RFID. In2006 International Conference on Hybrid Information Technology Nov. 9, 2006 (vol. 1, pp. 103-108). IEEE.
Extended European Search Report in EP23155658.0, mailed Sep. 20, 2023, 19 pages.
Hasler T, Wölbitsch M, Goller M, Walk S. Estimating relative tag locations based on time-differences in read events. In2019 IEEE International Conference on RFID (RFID) Apr. 2, 2019 (pp. 1-8). IEEE.
Melia-Segui J, Vilajosana X. Ubiquitous moisture sensing in automaker industry based on standard UHF RFID tags. In2019 IEEE International Conference on RFID (RFID) Apr. 2, 2019 (pp. 1-8). IEEE.
Mo L, Li C. Passive UHF-RFID localization based on the similarity measurement of virtual reference tags. IEEE Transactions on Instrumentation and Measurement. Sep. 27, 2018;68(8):2926-33.
Shangguan L, Yang Z, Liu AX, Zhou Z, Liu Y. Relative localization of (RFID} tags using {Spatial-Temporal} phase profiling. In12th USENIX Symposium on networked systems design and implementation (NSDI 15) 2015 (pp. 251-263).
Siachalou S, Megalou S, Tzitzis A, Tsardoulias E, Bletsas A, Sahalos J, Yioultsis T, Dimitriou AG. Robotic inventorying and localization of rfid tags, exploiting phase-fingerprinting. In2019 IEEE International Conference on RFID Technology and Applications (RFID-TA) Sep. 25, 2019 (pp. 362-367). IEEE.

* cited by examiner

VIRTUAL SHIELDING SYSTEM AND METHOD FOR INVENTORY TRACKING

CROSS-REFERENCE TO RELATED APPLICATIONS

The present application claims priority to and the benefit of U.S. Provisional Application No. 63/308,108 filed on Feb. 9, 2022, the disclosure of which is incorporated herein by reference in its entirety.

FIELD OF INVENTION

The present invention relates to a system and method for tracking and identifying the location of product inventory.

BACKGROUND

Security devices have continued to evolve over time to improve the functional capabilities and reduce the cost of such devices. Some security devices are currently provided to be attached to individual products or objects in order to deter or prevent theft of such products or objects. In some cases, the security devices include tags or other such components that can be detected by gate devices at the exit of a retail establishment. When the security device passes through or near the gates, an alarm locally at the product and/or at the gates may be triggered. Meanwhile, a key or deactivator may be provided at the point of sale terminal so that the security device can be removed or deactivated when the corresponding products or objects are purchased.

These security devices can also be utilized to determine the location or presence of the corresponding products for product tracking and inventory purposes. Cycle counts of items on the retail floors and in the backstock areas are conducted for creating a list of items to be replenished and to be reordered. Cycle counts are also conducted to establish inventory in various locations in the retail environment. Occasionally these cycle counted areas share a common wall. When the cycle count uses a filter that excludes items on the opposite side of the wall, cross-reads of items on the opposite side of the wall are ignored and an accurate count is obtained. However, when the filter includes items on the opposite side of the wall, inaccurate inventory counts occur. The use of the security devices for inventory tracking purposes generally requires systems employing security devices capable of longer range wireless communication with the security devices. Moreover, when conducting such wireless communication, the accuracy of the system relative to determining either location or presence of inventory becomes important.

One method of trying to improve accuracy of determining inventory location is to modify a separated area (e.g., a storage area or stocking area) to provide a shielding function to prevent a reader from reading inventory in the separated area. Shielding can be provided by certain types of paint, aluminum foil, barriers in the wall, etc. Incorporating these features can be expensive and can add costs to construction of a facility or added costs in trying retro fit a facility to provide this shielding functionality.

Many retail spaces and other spaces at which products are stored or displayed can present hostile wireless communication environments. The presence of metal shelving or equipment, the wireless communication activity of neighbors, the presence of electromagnetic interference (EMI) and other factors may all, individually or in combination, provide negative impacts on the ability of the security devices to accurately be detected or tracked.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, the present invention provides an inventory system. The inventory system can identify and monitor the location of products. The system can distinguish between inventory located in a first area and inventory located in a second area where there is a dividing wall or barrier between the two areas. The system and method may be useful, for example, in a setting where it is desirable to identify the types and inventory levels in a first area relative to the second area. Such systems and methods can be useful to track, for example, inventory on a retail floor that is on display for sale and inventory in a storage area. The system and method can be used for tracking various aspects of inventory control and flow including, but not limited, cycle counts of inventory, detecting out of stock conditions (in a display area or a storage area), track sales and inventory flow related to a promotional event, etc.

In one aspect, provided is a method for tracking an item comprising: (a) operating an RFID reader to obtain electronic product code data from an inventory item via an RFID reader; (b) operating an RFID reader to: (i) obtain location data from a product RFID tag associated with the inventory item; (ii) obtain read count and/or phase data from the product RFID tag associated with the inventory item; (iii) obtain read count and/or phase data from a reference RFID tag, the reference RFID tag positioned away from the product RFID tag; (c) running an algorithm on a computer to determine a location of the inventory item from the location data from the product RFID tag obtained in (b)(i), the read count and/or phase data from the product RFID tag obtained in (b)(ii), and the read count and/or phase data from the reference RFID tag obtained in (b)(iii); and (d) running an algorithm on a computer to determine a location of the inventory item from the electronic product code data obtained in (a) and the location of the inventory item from (c).

In one embodiment, the reference RFID tag is positioned at a fixed location.

In one embodiment, the reference RFID tag is positioned on a physical partition.

In one embodiment in accordance with any of the previous embodiments, the reference RFID tag is provided by a plurality of reference RFID tags.

In one embodiment, a plurality of reference RFID tags define a virtual boundary, and the inventory item can be positioned inside or outside of the virtual boundary.

In one embodiment in accordance with any of the previous embodiments, the RFID reader conducts the operation of step (c) and/or (d).

In one embodiment in accordance with any of the previous embodiments, the RFID reader communicates the data obtained in (a) and (b) to an external location, the external device comprising the computer to run the algorithm in (c) and/or (d). In one embodiment, the external location is selected from a server or a cloud computing processor.

In one embodiment in accordance with any of the previous embodiments, the method comprises communicating the location data obtained in (d) to an inventory management system.

In one embodiment in accordance with any of the previous embodiments, the location data is received signal strength indication data.

In another aspect, provided is an inventory tracking system comprising: an inventory area comprising one or more inventory items, the one or more inventory items each having an RFID tag associated therewith, the RFID tag comprising data identifying a location of the one or more inventory items; one or more reference RFID tags positioned at a location relative to the one or more inventory items; and an RFID reader for obtaining data from the RFID tag associate with each of the one or more inventory items and from the one or more reference RFID tags.

In one embodiment, the one or more reference RFID tags are positioned on a fixed partition.

In one embodiment, the one or more reference RFID tags include a plurality of tags positioned at fixed positions to define a virtual boundary.

In one embodiment, the virtual boundary is in the shape of a regular or non-regular polygon.

In one embodiment in accordance with any of the previous embodiments, the RFID reader is a mobile RFID reader.

In one embodiment in accordance with any of the previous embodiments, the RFID reader is at a fixed location.

In one embodiment, the RFID reader is positioned at a height above the one or more inventory items.

In one embodiment in accordance with any of the previous embodiments, the one or more reference tags are located on the RFID reader.

Still another aspect, provided is a method for tracking an item comprising: (a) operating an RFID reader to obtain electronic product code data from an inventory item via an RFID reader; (i) the RFID reader having a localization tag; (b) operating an RFID reader to: (i) obtain location data from a product RFID tag associated with the inventory item; (ii) obtain read count and/or phase data from the product RFID tag associated with the inventory item; (c) running an algorithm on a computer to determine the location of the reader based from data from the localization tag, and, (d) running an algorithm on a computer to determine the location offset from the inventory item to the RFID reader.

In one embodiment, the method comprises a plurality of anchors each with a defined position, each anchor configured to communicate the position of the anchor to a server, where the anchors are arranged such that they define a virtual boundary.

In one embodiment, the inventory item is positioned within the virtual boundary, and step (b) comprises obtaining location data, read count data, and/or phase data from the product RFID tag located within the virtual boundary.

In one embodiment, the server processes the RFID measurements from the RFID tag associated with the inventory item, and the measurements from the localization tag and generates position information of the RFID tag associated with the inventory item.

In one embodiment, the method comprises providing the position information of the RFID associated with the inventory item to an inventory management system.

In one embodiment in accordance with any of the previous embodiments, the location data is received signal strength indication data.

In one embodiment in accordance with any of the previous embodiments, the localization tag is selected from an RFID tag, WiFi tag, low energy Bluetooth tag, or ultra wideband tag.

In yet another aspect, provided is a method for tracking an item comprising: (a) operating an RFID reader to obtain electronic product code data from an inventory item via an RFID reader; (b) operating an RFID reader to: (i) obtain location data from a product RFID tag associated with the inventory item; (ii) obtain read count and/or phase data from the product RFID tag associated with the inventory item; (c) running an algorithm on a computer to determine a location of the inventory item from the electronic product code data, the location data obtained in ((b)(i), and the read count and/or phase data from the second RFID tag obtained in (b)(ii); and (d) running an algorithm on a computer to determine a location of the inventory item from the electronic product code data obtained in (a) and the location of the inventory item from (c).

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1:
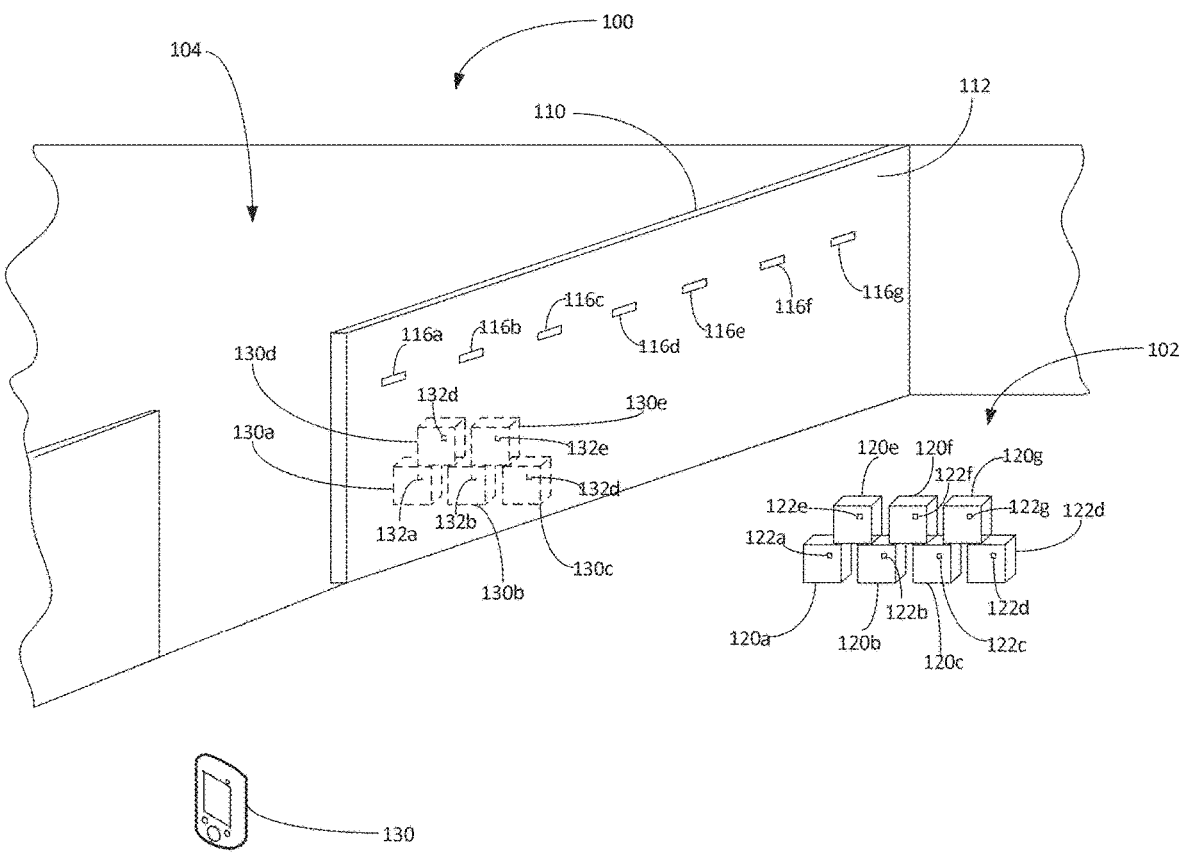
FIG. 1 is a perspective view of a retail system in accordance with an embodiment of the invention.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words "example" and "exemplary" means an instance, or illustration. The words "example" or "exemplary" do not indicate a key or preferred aspect or embodiment. The word "or" is intended to be inclusive rather than exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "memory", as used herein can include volatile memory and/or nonvolatile memory. Non-volatile memory can include, for example, ROM (read only memory), PROM (programmable read only memory), EPROM (erasable PROM), and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDRSDRAM), and direct RAM bus RAM (DR-RAM). The memory can also include a drive (disk). The memory can store an operating system that controls or allocates resources of a computing device. The memory can also store data for use by the processor.

A "controller", as used herein, can a include a variety of configurations, for example a processor and memory. Controller, can also include a microcontroller having on-board processor and memory.

A "drive", as used herein can be, for example, a magnetic drive, a solid state drive, a floppy drive, a tape drive, a Zip drive, a flash memory card, and/or a memory stick. Furthermore, the drive can be a CD-ROM (compact disk ROM), a CD recordable drive (CD-R drive), a CD rewritable drive (CD-RW drive), and/or a digital video ROM drive (DVD ROM). The drive can store an operating system and/or program that controls or allocates resources of a computing device.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical non-transitory signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality. The algorithms can also be selected from an Artificial Intelligence (A.I.) algorithm. Such algorithms can include machine learning algorithms including, but not limited to, supervised learning, unsupervised learning, semi-supervised learning, reinforcement learning, transduction, learning to learn algorithms, genetic algorithms, ant algorithms, tabu search algorithms, or Monte Carlo algorithms (e.g., simulated annealing) or some other suitable network.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments described herein include process steps and instructions described herein in the form of an algorithm. It should be noted that the process steps and instructions of the embodiments could be embodied in software, firmware or hardware, and when embodied in software, could be downloaded to reside on and be operated from different platforms used by a variety of operating systems. The embodiments can also be in a computer program product which can be executed on a computing system.

Provided is a system and method for identifying the location of inventory. The system and method can be used to identify the location of inventory and, from the location information/data, track inventory (e.g., conduct cycle counts), track flow of inventory with respect to a selected sales promotion, etc. In one embodiment, the system and method allows for identifying whether inventory is located on the retail floor versus inventory that is located off the retail floor and located in a storage area that may be separated from the retail area by a partition (e.g., a dividing wall or display barrier).

FIG. 1 shows an embodiment of an inventory system in accordance with an embodiment of the invention. The inventory system 100 includes a first area 102 and a second area 104 separated by a partition 110. Inventory (e.g., packages 120a-120g and 130a-130e) is located in each of the first area 102 and the second area 104. In embodiments, the first area may represent a retail floor space configured to display inventory 120a-g for sale. The second area 104 may represent a storage area for inventory 130a-e that is to be used to replenish the stock of inventory on the retail floor as it is removed from the retail floor such as after purchase by a customer. Inventory packages 120a-g include an RFID tag (tags 122a-122g) with electronic product code information related to the respective products, and inventory packages 130a-130e include an RFID tag (tags 132a-132e) with electronic product code information related to the respective products to which they are attached or associated.

The inventory system includes a partition 110 dividing the areas 102 and 104. In the system, one or more reference or control RFID tags are positioned on the partition. In the embodiment in FIG. 1, RFID tags 116a-116g are positioned on a surface 112 of the partition. The RFID tags disposed on the partition 110 can be located on any surface of the partition. In one embodiment, when multiple RFID tags are disposed on the partition, all the tags should be disposed on the same surface of the partition. The RFID tags positioned on a surface of a partition may be disposed at random or fixed distances from one another.

The system includes an RFID reader 130 configured to access, receive, collect, or otherwise obtain data from the RFID tags located on the products or inventory (e.g., RFID tags 122a-g and 132a-e) and from the RFID tags positioned on the partition (e.g., RFID tags 116a-116g). The reader is not particularly limited and may be a mobile RFID reader or it may be fixed and positioned at a selected location as desired for a particular purpose or intended application. Further, multiple RFID readers may be employed in the system and positioned at different locations. For example, the reader could be fixed at a location or position on the floor or a wall, or it may be an overhead reader positioned on a ceiling or high up on a wall above the inventory areas. Readers can also be placed at entry and exit locations of the location.

In the system, the position and location of inventory is determined by collecting data from the various RFID tags and correlating that to a position within the store, warehouse, distribution center, etc. The RFID reader is operated to collect data from an RFID tag on an inventory item. In addition to the EPC data and the location data, other data may be collected including, but not limited to, read time data (i.e., the time at which the RFID tag was read by the RFID reader). The location data may be obtained using any suitable technique for evaluating the location of the RFID tag relative to the RFID reader. Suitable techniques for determining location of an RFID tag include, for example, received signal strength indication (RSSI), the RFID reader receives RSSI data from the RFID tag associated with the inventory item being evaluated. Generally, the RFID tags that are further away from the RFID reader will have a weaker signal.

Applicant has found that the use of a single source of location data alone is likely not sufficient to accurately identify the location of inventory within a given space. Location data alone, such as RSSI data, is not accurate enough to reliably identify the position of inventory packaging. For example, RFID tags with inherently weaker signals (smaller in size, etc) may give a false indication that an RFID tag is positioned "far" from the reader when it is not actually far from the reader. Additionally, reflections from metal objects may affect the readings. The combination of the location data and another layer of data that more accurately identifies the location of the reader. Tag phase data, read count data, angle of arrival (AOA), time of arrival (TOA), time differential of arrival (TDOA), etc are other secondary metrics which can be employed.

The RFID reader further collects read count data and tag phase data, computing the phase data of the RFID on the inventory package being analyzed relative to one or more of the reference or control RFID tags 116a-116g disposed on the partition 110. The reader may include a comparator configured to compare a received signal strength of the radio frequency signals from each of the RFID tag from the inventory package and the RFID tag(s) located on the partition in accordance with a plurality of time samples. The comparator is configured to compare the read count and optionally the signal phase information. A determination of a signal phase of the respective radio signals is made in accordance with a plurality of time samples. Generally, the phase of the tag located on the side of the wall opposite to where the RFID reader is located will have a phase greater than that of the RFID tags positioned on the wall.

Figure 2:
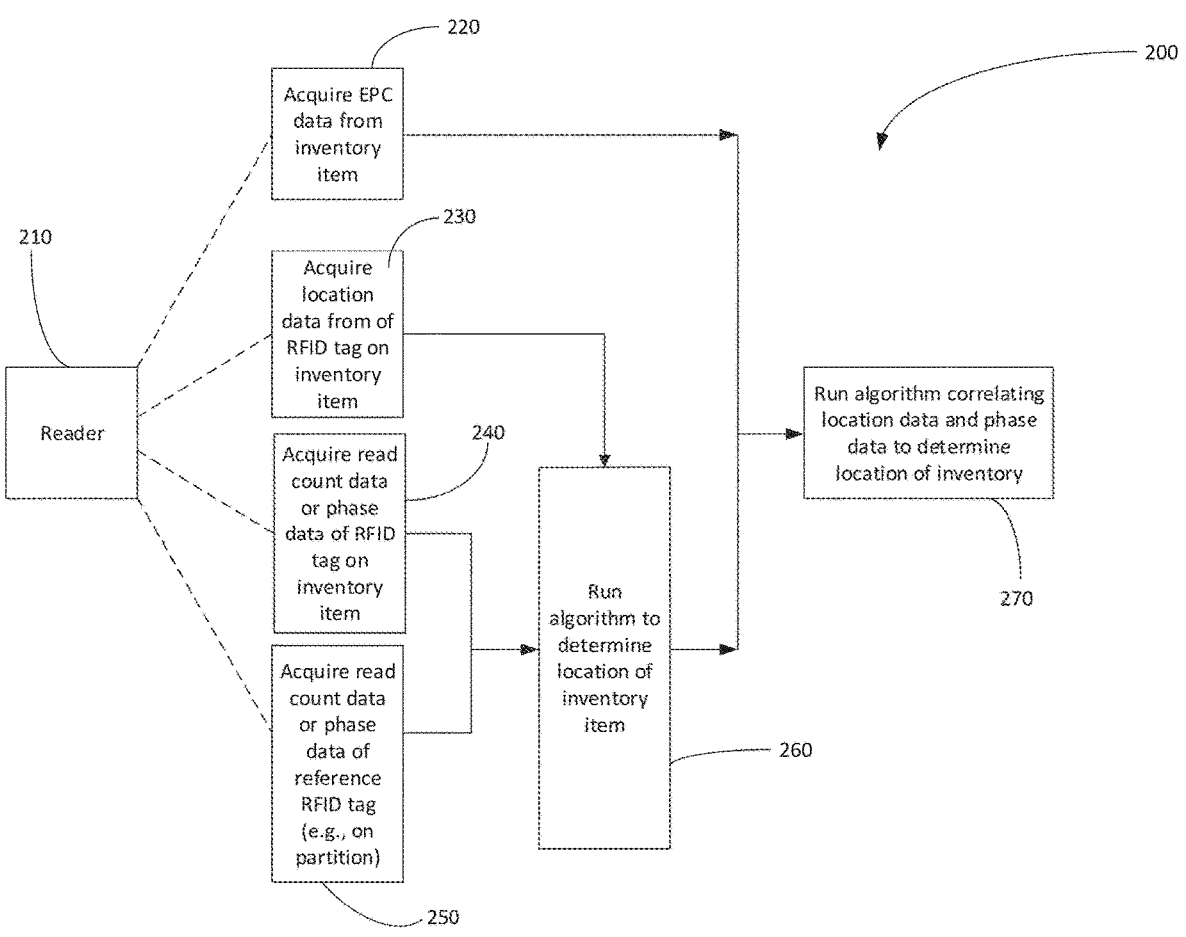
FIG. 2 is a flow chart of a process for identifying the location of products within an environment.

The system can operate as shown in FIG. 2 where the process 200 of identifying the location of inventory product includes an RFID reader 210 initiating an operation to (i) acquire EPC data associated with an inventory item (220), (ii) acquire location data (e.g., RSSI data, AOA, TDA, etc.) from an RFID tag associated with the inventory item being analyzed (230), (iii) acquire read count and/or phase data from an RFID tag associated with the inventory item being analyzed (240), and (iv) acquiring read count and/or phase data from a reference RFID tag at a fixed location (e.g., positioned or disposed on a partition dividing a first area and a second area housing inventory items (250). A program at step 260 runs an algorithm to determine a location of the inventory item based on the phase data collected at 240 and 250. At step 270, a program runs an algorithm determining the location of the inventory item based on the information acquired from steps 220, 230, and 260. It will be appreciated that the software, programs, etc. for determining the location data and secondary metric data can be located on a reader itself, on an external device that may be in communication with the reader (most likely via wireless communication), or the cloud.

The location data collected at step 270 can be collected for one or more inventory items. It will be appreciated that a single reader or multiple readers can be used to collect location data of a plurality of inventory items. The location data can be transmitted to a program that is configured to create one or more data sets identifying aspects of the inventory such as quantity of inventory, quantity of a subset of inventory (e.g., size, color, size/color, etc.), and the like. The data sets can be sent to or observed by personnel to allow personnel to make a decision with respect to actions that need to be taken with respect to the inventor (e.g., restocking, reordering, etc.). The software/programs may also be configured to create alerts based on the information in the data set. The software/program may be configured, for example, to create an alert once a threshold limit of inventory is achieved in a particular area. The alert can be pushed to an app or a device notifying personnel that restocking of a particular product in a display area is required or that inventory in a storage/stocking area is low and needs to be reordered. The programs and software analyzing the location data may be housed on the RFID reader itself, on a remote computer or device, or in the cloud.

Figure 3:
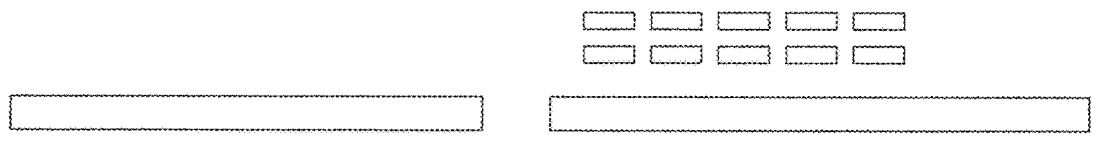
FIGS. 3 and 4 is a perspective view of a non-linear, volumetric boundary with a regular and irregular shapes.
Figure 3:
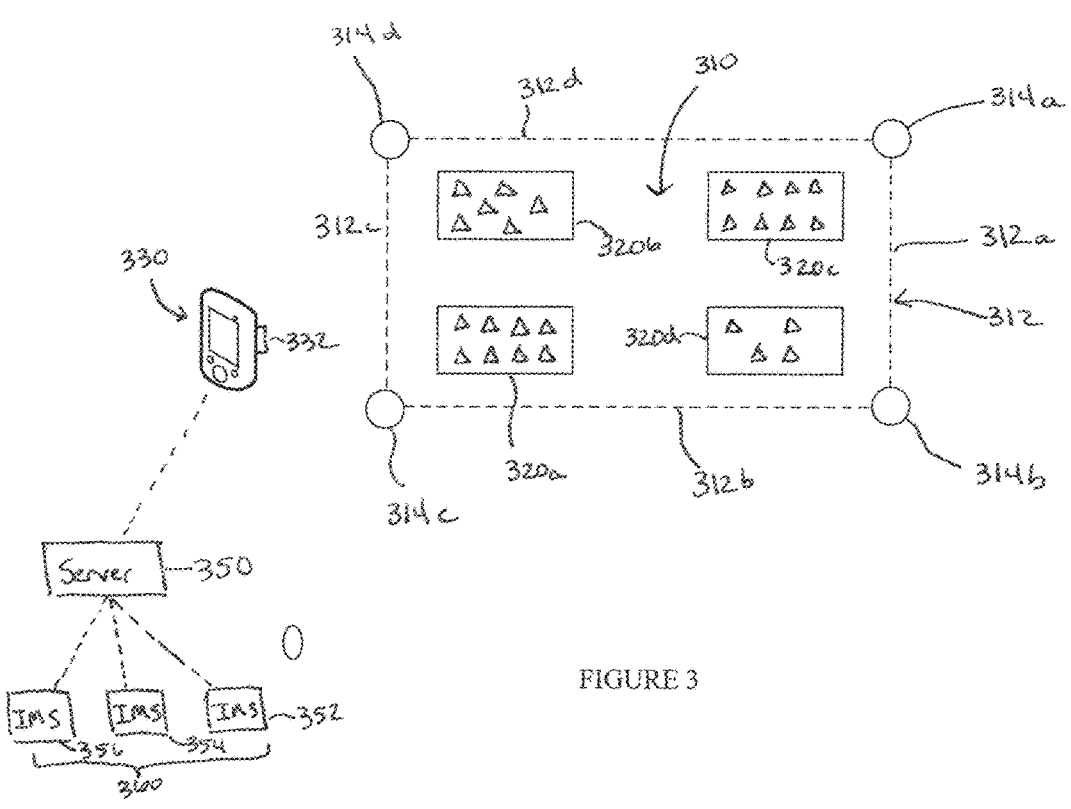
Figure 4:
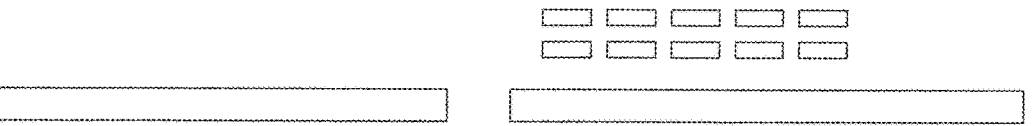
Figure 4:
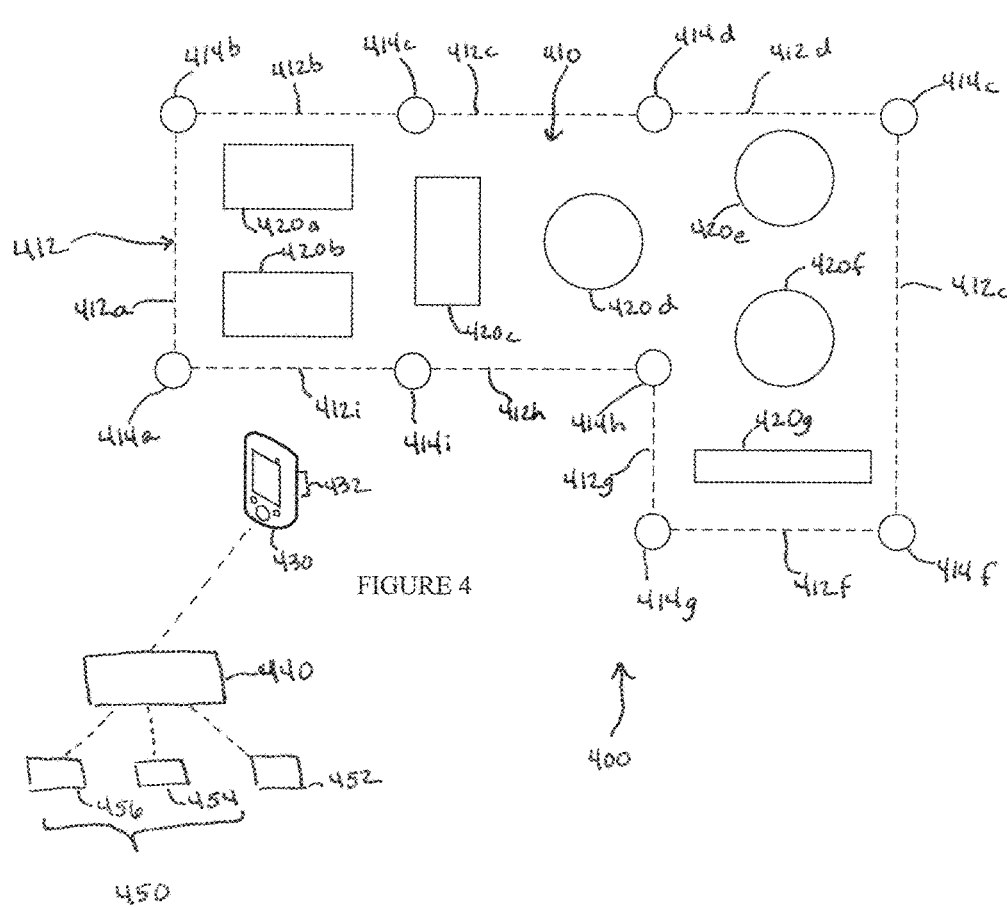

Some embodiments of this invention can identify the location of inventory items within a non-linear, volume metric boundary (3D). FIGS. 3 and 4 define simple and complex areas, respectively, within a retail space where control or reference tags have been placed for identifying the spacial boundary. These areas may also be referred to herein as virtual boundaries An RFID reader collects location data, read count data, or phase data from the inventory items and the reference or control tags, and runs the algorithm (FIG. 2, 270) for obtaining the items locations, inside or outside the boundary.

Referring to FIG. 3, an inventory system 300 includes an inventory area 310 defined by a virtual boundary 312. Displays 320a, 320b, 320c, and 320d containing products are located within inventory area 310. The displays may be shelving units, racks, etc. The virtual boundary 312 is defined by virtual "walls" 312a, 312b, 312c, and 312d. The virtual walls are defined by anchors 314a, 314b, 314c, and 314d. The anchors 314a-314d are control tags with a defined position. The anchors can be provided by, for example, RFID tags. The anchors are encoded in a manner that clearly defines/delineates it as a control tag. The anchors communicate with a server 350 (such as a real time location systems (RTLS) server) to provide information regarding their location. The anchors can be physically wired to the server or they can communicate wirelessly (e.g., Wi-Fi).

An RFID reader 330 is used to collect location data (RSSI, etc), read count data, or phase data from the inventory items and the anchors. The RFID reader 330 includes a localization tag 332 attached to the RFID. The RFID reader communicates with the server 350 and the server stores the localization tag's 332 position. The RFID reader stores the RFID measurements from the inventory within the virtual boundary. After completing reading of the inventory tags, the RFID measurements are sent to the server to be processed. The server 350 processes the RFID measurements and the localization measurements to generate the RFID position information of the RFID tags located within the virtual boundary 310. The server 350 provides the final RFID position information to an inventory management system (IMS) 360 in an agreed format. The inventory management system 360 can be provided as one or more other servers 352, 354, 356, or in a cloud server.

As shown in FIG. 3, the virtual boundary is defined as a rectangular area. Virtual boundary areas need not be limited to rectangular areas and can be generally provided in the shape of any polygon. The polygon may be regular or irregular. Examples of suitable shapes for the virtual boundary areas include, but are not limited to, a triangle, a rectangle, a trapezoid, a pentagon, a hexagon, a heptagon, an octagon, etc.

FIG. 4 shows an inventory system 400 having an inventory area 410 defined by a virtual boundary having a non-regular polygonal shape.

The localization tags can be provided by a suitable tag now known or later discovered that has or can be adjusted to have a relatively low power output. Relatively low power is needed for the localization tags since they are reading inventory tags from a short distance (e.g., less than 3 feet away and typically 2-3 feet away). In one embodiment the localization tag on the RFID reader can be based on ultra-wideband radios). These types of tags can provide a good balance of localization precision and the number of anchors needed to define the virtual boundary. Displays 420a, 420b, 420c, 420d, 420e, 420f, and 420g containing products are located within inventory area 410. The displays may be shelving units, racks, etc. The virtual boundary 412 is defined by virtual "walls" 412a, 412b, 412c, 412d, 412e, 412f, 412g, 412h, and 412i. The virtual walls are defined by anchors 414a, 414b, 414c, 414d, 414e, 414f, 414g, 414h, and 414i. The anchors 314a-314d are control tags with a defined position.

An RFID reader 430 is used to collect location data, read count data, or phase date from the inventory items and the anchors. The RFID reader 430 includes a localization tag 432 attached to the RFID. The RFID reader communicates with the server 440 and the server stores the localization tag's 432 position. The RFID reader stores the RFID measurements from the inventory within the virtual boundary. After completing reading of the inventory tags, the RFID measurements are sent to the server to be processed. The server 440 processes the RFID measurements and the localization measurements to generate the RFID position information of the RFID tags located within the virtual boundary 410. The server 440 provides the final RFID position information to an inventory management system 40 in an agreed format. The inventory management system 450 can be provided as one or more other servers 452, 454, 456, or in a cloud server.

Figure 5:
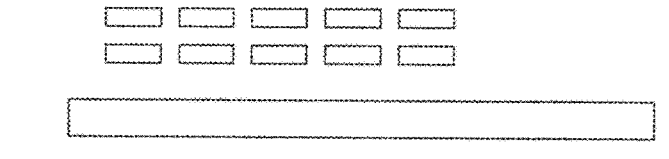
FIG. 5 is a perspective view of an area with tagged item locations being determined through the use of a reader mounted wireless tag.
Figure 5:
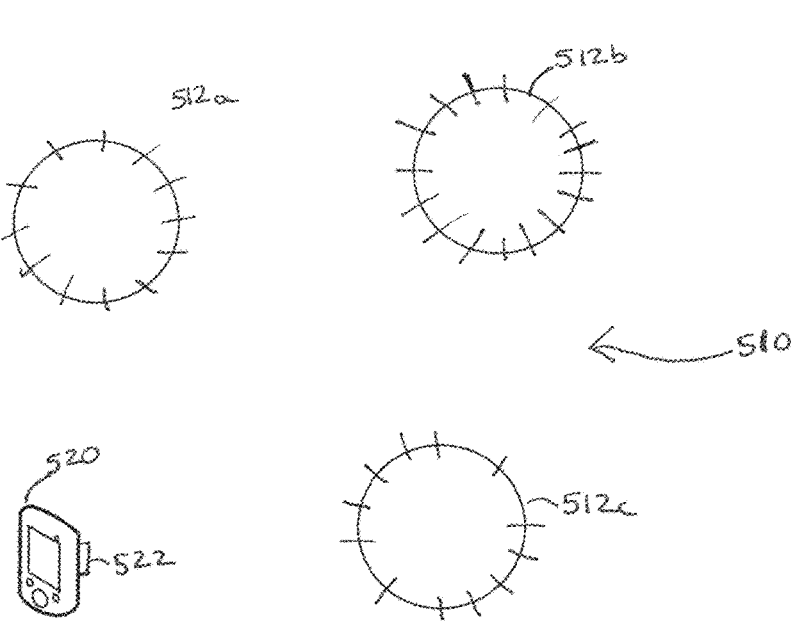

In another embodiment, shown in FIG. 5, an inventory system is employed that does not include a virtual boundary. As shown in FIG. 5, an inventory area 510 includes a number of displays 512a, 512b, and 512c containing inventory items. The displays 512a, 512b, and 512c can be shelving units, racks, etc. In the system 500, an RFID reader 520 includes a tag 522 that is provided as a reference tag. The reference tag 522 can be, for example, an RFID or WiFi or Low Energy Bluetooth (BLE) reference. In this system, data is collected from the inventory items and the control or reference tag 522 attached to the reader 520, and the item locations can be determined as an offset from the reader location as determined from multiple of RFID readers, WiFi access points or BLE beacons.

The inventory items and boundaries can be located anywhere in the retail or storage environment. As shown in FIGS. 3-5, the inventory items and boundary areas, where applicable, may be considered to be on the retail floor at a position a selected distance from a wall or other boundary separating the retail area from another area of the store.

In another embodiment, reference or control tags are not required. Item locations are derived through the use of robust location algorithms which are periodically improved through the use of artificial intelligence (AI). The data collection process is the same as described earlier in this disclosure for inventory items. EPC associated location data (RSSI, etc) and read count data is processed by an algorithm and the item location is determined to be within or outside the boundary. Systematic checks are run periodically to improve the item location accuracy with a known data set of item locations. The algorithm is optimized using a set of AI learning tools. In one embodiment, a method for tracking an item comprises: (a) operating an RFID reader to obtain electronic product code data from an inventory item via an RFID reader; (b) operating an RFID reader to: (i) obtain location data from a product RFID tag associated with the inventory item; (ii) obtain read count and/or phase data from the product RFID tag associated with the inventory item; (c) running an algorithm on a computer to determine a location of the inventory item from the electronic product code data, the location data obtained in ((b)(i), and the read count and/or phase data from the second RFID tag obtained in (b)(ii); and (d) running an algorithm on a computer to determine a location of the inventory item from the electronic product code data obtained in (a) and the location of the inventory item from (c).

The system and process can be used to determine the location of multiple inventory items in a location. From the EPC data and the location data, the system can be used, in one embodiment, to track inventory within a location, which may be useful for a variety of functions. In one embodiment, the invention includes a computerized method of detecting out-of-stock conditions for retail products. RFID data can be accessed or received continuously in real time, or in any possible frequency such as seconds, minutes, hours, or days. RFID data can be automatically or manually accessed.

The RFID location data accessed by the invention is sufficient for the invention to identify whether RFID-tagged retail products are located on a retail store sales floor or in a retail store backroom. The product stocking events associated with RFID location data are any type of stocking event such as regular shelf stocking, promotional events, and new products. The invention then identifies out-of-stock conditions for the product stocking event based on the accessed RFID location data. Once out-of-stock conditions are identified, the invention can perform any number of functions such as update a product stocking event plan, send alerts to users, sales associates or retail store employees, update supplier's event scripts, and update sales forecasts. Sales forecasts include predictions of what a retailer or supplier will sell by store and by date. The invention can additionally access point-of-sale data and/or perpetual inventory data associated with the product stocking event, and use this data, with the RFID location data to identify out-of-stock conditions.

In another embodiment, the invention accesses historical RFID data associated with a completed product stocking event. Historical RFID data includes information about completed movements of RFID-tagged retail products within a retail supply chain and within a retail store. Historical RFID data is used to create event scripts for a product stocking event. These event scripts can also be based on historical point-of-sale or perpetual inventory data. The invention then uses a combination of RFID, point-of-sale, and perpetual inventory data to identify out-of-stock conditions and update these event scripts.

In another embodiment, the invention uses current and/or historical RFID data to predict out-of-stock conditions based on timing, movement, and location of RFID-tagged retail products across a set of RFID-enabled retail stores. The invention identifies stores with out-of-stock conditions to provide an opportunity for correction, and for dynamically updating sales forecasts and event scripts. The invention also identifies stores that will most likely not comply with a given prod stocking event by a scheduled start or end date.

In another embodiment, the invention includes a method of out-of-stock velocity detection and comparative dynamic scripting for retail products. The invention monitors RFID data for multiple product stocking events. The invention also monitors point-of-sale data for product stocking events including turn stock products. Sales of products among multiple product stocking events are analyzed and compared. Based on comparisons and identified velocity of sales from monitored events, the invention optimizes a sales floor product location plan, a planogram, or event scripting including instructions about diverting products from low-performing stores to high-performing stores. RFID and point-of-sale data can be combined with perpetual inventory data.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing description identifies various, non-limiting embodiments of an inventory tracking system. Modifications may occur to those skilled in the art and to those who may make and use the invention. The disclosed embodiments are merely for illustrative purposes and not intended to limit the scope of the invention or the subject matter set forth in the claims.

What is claimed is:

1. A method for tracking an item comprising:
(a) operating an RFID reader to obtain electronic product code data from an inventory item via an RFID reader;
(b) operating an RFID reader to:
  (i) obtain location data from a product RFID tag associated with the inventory item;
  (ii) obtain read count and/or phase data from the product RFID tag associated with the inventory item;
  (iii) obtain read count and/or phase data from a reference RFID tag, the reference RFID tag positioned away from the product RFID tag;

12

(c) running an algorithm on a computer to determine a location of the inventory item from the location data from the product RFID tag obtained in (b) (i), the read count and/or phase data from the product RFID tag obtained in (b) (ii), and the read count and/or phase data from the reference RFID tag obtained in (b) (iii); and
(d) running an algorithm on a computer to determine a location of the inventory item from the electronic product code data obtained in (a) and the location of the inventory item from (c).

2. The method of claim 1, wherein the reference RFID tag is positioned at a fixed location.

3. The method of claim 1, wherein the reference RFID tag is positioned on a physical partition.

4. The method of claim 1 comprising the reference RFID tag is provided by a plurality of reference RFID tags.

5. The method of claim 1, wherein a plurality of reference RFID tags define a virtual boundary, and the inventory item can be positioned inside or outside of the virtual boundary.

6. The method of claim 1, wherein the RFID reader conducts the operation of step (c) and/or (d).

7. The method of claim 1, wherein the RFID reader communicates the data obtained in (a) and (b) to an external location, the external device comprising the computer to run the algorithm in (c) and/or (d).

8. The method of claim 7, wherein the external location is selected from a server or a cloud computing processor.

9. The method of claim 1, comprising communicating the location data obtained in (d) to an inventory management system.

10. The method of claim 1, wherein the location data is received signal strength indication data.

11. A method for tracking an item comprising:
(a) operating an RFID reader to obtain electronic product code data from an inventory item via an RFID reader;
  (i) the RFID reader having a localization tag;
(b) operating an RFID reader to:
  (i) obtain location data from a product RFID tag associated with the inventory item;
  (ii) obtain read count and/or phase data from the product RFID tag associated with the inventory item;
(c) running an algorithm on a computer to determine the location of the reader based from data from the localization tag, and,
(d) running an algorithm on a computer to determine the location offset from the inventory item to the RFID reader.

12. The method of claim 11 comprising a plurality of anchors each with a defined position, each anchor configured to communicate the position of the anchor to a server, where the anchors are arranged such that they define a virtual boundary.

13. The method of claim 12, wherein the inventory item is positioned within the virtual boundary, and step (b) comprises obtaining location data, read count data, and/or phase data from the product RFID tag located within the virtual boundary.

14. The method of claim 13, wherein the server processes the RFID measurements from the RFID tag associated with the inventory item, and the measurements from the localization tag and generates position information of the RFID tag associated with the inventory item.

15. The method of claim 14 comprising providing the position information of the RFID associated with the inventory item to an inventory management system.

16. The method of claim 11, wherein the location data is received signal strength indication data.

17. The method of claim 11, wherein the localization tag is selected from an RFID tag, WiFi tag, low energy Bluetooth tag, or ultra wideband tag.

\* \* \* \* \*